3,116,322
4-HALO-2-BUTYNYL CARBAMATES

Thomas R. Hopkins, Prairie Village, and Joe W. Pullen, Overland Park, Kans., assignors to Spencer Chemical Company, Kansas City, Mo., a corporation of Missouri
No Drawing. Filed Aug. 24, 1960, Ser. No. 51,510
2 Claims. (Cl. 260—471)

This invention relates to chemical compounds having herbicidal properties. More particularly, this invention is concerned with novel 4-halo-2-butynyl carbamates having herbicidal activity.

This application is a continuation-in-part of our co-pending application Serial No. 786,674, filed January 14, 1959.

According to the present invention there are provided novel 4-halo-2-butynyl N-allyl-N-(3-halophenyl)carbamates and novel 4-halo-2-butynyl N-(1,2,4-triazol-3-yl) carbamates.

Representative of the 4-halo-2-butynyl N-allyl-N-(3-halophenyl)carbamates is 4-chloro-2-butynyl N-allyl-N-(3-chlorophenyl)carbamate which has been found to have rather selective post-emergence herbicidal or plant growth regulating properties against millet, flax and oats. The activity of this compound was evaluated according to a standard foliage herbicide screen as follows:

A water suspension of the compound was prepared by adding to 0.4 g. of the compound in a mortar, 4 drops of Emulphor EL (a polyoxyethylated vegetable oil) and the mixture was ground together in the mortar. A few drops of water were added and when the mixture was workable, additional water was added to bring the volume up to 20 ml. 20 ml. of a kerosene emulsion (19% kerosene and 1% Emulphor EL in water) was added. Oats (*Avena sativa*), wheat, peas, radish, flax, alfalfa, millet, sugar beets, and "Bonnie Best" tomatoes were planted in 4" clay pots. When the plants had reached a suitable growth (3"–8") they were sprayed with the above water emulsion at the rate of 5 lbs. of the carbamate per acre at a spray volume of 60 gallons of water per acre. Two weeks after the application the plants were observed and the results of treatment recorded as in Table 1.

TABLE 1

| Compound | Effects a on Various Crops (Application Rate 5 lbs./A.) | | | | | | | | |
|---|---|---|---|---|---|---|---|---|---|
| | Oats | Wheat | Peas | Radish | Flax | Millet | Alfalfa | Tomato | Sugar Beets |
| N-allyl derivative | G2 | 0 | ------ | 0 | G3 | 4 | 0 | 0 | 0 | a Key to ratings: C=chlorosis; G=inhibition of growth; N=necrosis; 0=no effect; (=slight (less than 25% affected foliage); 2=moderate (25%–70% affected foliage); 3=severe 171%–99% affected foliage); 4=dead plants.

Additional herbicidal tests were run with 4-chloro-2-butynyl N-allyl-N-(3-chlorophenyl)carbamate with results obtained reported in Table 2.

TABLE 2

| Crop | Application Rate, Pounds/Acre | Effect [1] |
|---|---|---|
| Sheep sorrel | 4 | G3. |
| | 1 | G3. |
| Wild buckwheat | 4 | G3. |
| Basil | 4 | G2. |
| Sweet corn | 5 | G1. |
| | 1 | G1. |
| Tartary buckwheat | 5 | G1. |
| | 1 | G1. |

[1] The scale of Table 1 was used for evaluation.

4-chloro-2-butynyl N-(1,2,4-triazol-3-yl)carbamate was evaluated for herbicidal activity using the standard post emergence herbicide screening test described above. The application rate was 5 lb./acre. The following results were obtained:

TABLE 3

| Oats | Wheat | Soybeans | Radish | Flax | Millet | Alfalfa | Tomato | Sugar Beets |
|---|---|---|---|---|---|---|---|---|
| C3 | C4 | CN2 | C2 | C2 | C4 | C3 | C1 | CN1 |

Evidence indicates that the carbamates of this invention have herbicidal activity when applied at the rate of about 0.10 to about 25 pounds/acre; however, a rate of 0.5 to 10 pounds/acre is advisably employed in most cases.

The compounds can be applied as powders or in liquid carriers as solutions or dispersions. Sticking agents and wetting agents and other conventional adjuvants can be employed as advisable.

The following examples illustrate the preparation of the novel compounds of this invention.

Example 1
4-CHLORO-2-BUTYNYL N-ALLYL-N-(3-CHLOROPHENYL) CARBAMATE

To a stirred mixture of 276.1 g. (1.65 mole) of N-allyl-3-chloroaniline, 1.65 mole of pyridine and 1000 ml. of benzene was added 275.5 g. (1.65 mole) of 4-chloro-2-butynyl chlorocarbonate, dropwise at 15°–20° C., over a period of about 1 hour. Stirring was continued at ambient temperature for about 2 hours. One liter of water was added to the mixture and, after stirring, the organic layer was separated and washed with dilute hydrochloric acid, with water and then dried over anhydrous magnesium sulfate. The solvent was removed by distillation under reduced pressure (water aspirator) to give 4-chloro- 2-butynyl N-allyl-N-(3-chlorophenyl)carbamate, which has a boiling point of 159° C./0.45 mm.; $N_D^{23}$ 1.5566.

*Example 2*

4-CHLORO-2-BUTYNYL N-(1,2,4-TRIAZOL-3-YL) CARBONATE

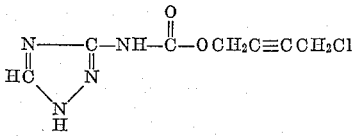

To a stirred mixture of 25 grams of sodium hydroxide dissolved in 100 ml. of water and 42 g. of 3-amino-1,2,4-triazole in 100 ml. of benzene was added 83.5 grams of 4-chloro-2-butynyl-chloroformate at 25°–30° C. The resulting solid precipitate was removed by filtration, washed with cold benzene and then with water. The washed crystalline material was dissolved in hot acetone, the acetone solution filtered and then diluted with n-hexane. The solution was chilled, crystallizing the product, which was removed by filtration. A yield of 46 g. (43%) of the carbamate, M.P. 157° C. with decomposition, was obtained.

Various changes and modifications of the invention can be made and, to the extent that such variations incorporate the spirit of this invention, they are intended to be included within the scope of the appended claims.

What is claimed is:

1. 4-halo - 2 - butynyl N-allyl-N-(3-halophenyl)carbamate.

2. 4 - chloro-2-butynyl N-allyl-N-(3-chlorophenyl)carbamate.

References Cited in the file of this patent

UNITED STATES PATENTS

| 2,788,268 | Tursich | Apr. 9, 1957 |
| 2,806,051 | Brockway | Sept. 10, 1957 |
| 2,823,987 | Fielden | Feb. 18, 1958 |
| 2,906,614 | Hopkins et al. | Sept. 29, 1959 |
| 2,914,536 | Hardy et al. | Nov. 24 1959 |

OTHER REFERENCES

Etingof et al.: Chem. Abstracts vol. 49, col. 5584 (1955).

Ag. and Food Chem. vol. 7, pp. 808–9 (1959).

UNITED STATES PATENT OFFICE
CERTIFICATE OF CORRECTION

Patent No. 3,116,322                      December 31, 1963

Thomas R. Hopkins et al.

It is hereby certified that error appears in the above numbered patent requiring correction and that the said Letters Patent should read as corrected below.

Column 1, TABLE 1, footnote to the table, lines 2 and 3 thereof, for "(=slight" read -- 1=slight --, and for "171%-99%" read -- (71%-99% --; column 3, line 5, in the heading to Example 2, for "CARBONATE", in italics, read -- CARBAMATE --, in italics.

Signed and sealed this 2nd day of June 1964.

(SEAL)
Attest:

ERNEST W. SWIDER                      EDWARD J. BRENNER
Attesting Officer                          Commissioner of Patents